Figure 1:
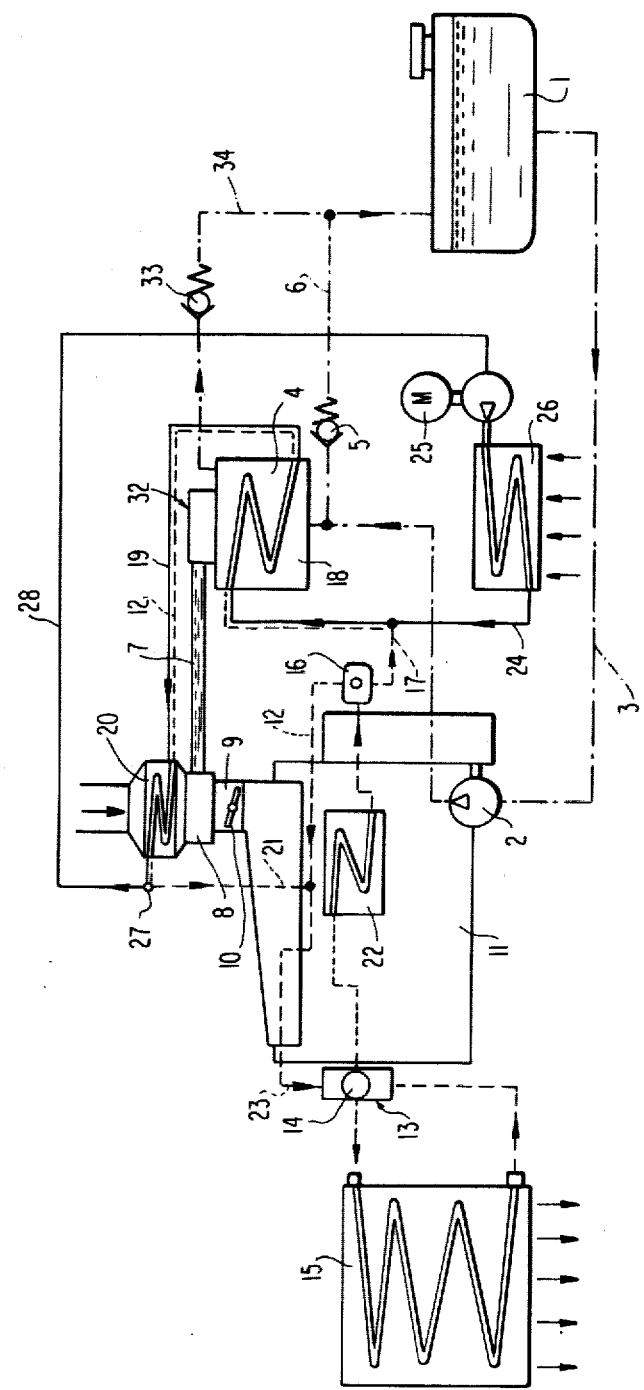

United States Patent [19]

Wolters et al.

[11] 4,341,194
[45] Jul. 27, 1982

[54] INTERNAL COMBUSTION ENGINE, ESPECIALLY FOR TRUCKS DRIVEN WITH GAS-STORED IN LIQUID CONDITION IN A FUEL TANK

[75] Inventors: Gerhard Wolters, Gaggenau; Horst Bergmann, Esslingen, both of Fed. Rep. of Germany

[73] Assignee: Daimler-Benz Aktiengesellschaft, Stuttgart, Fed. Rep. of Germany

[21] Appl. No.: 182,824

[22] Filed: Aug. 29, 1980

[30] Foreign Application Priority Data

Aug. 29, 1979 [DE] Fed. Rep. of Germany ....... 2934797

[51] Int. Cl.³ .............................................. F02M 31/00
[52] U.S. Cl. .................................. 123/557; 123/552; 123/555; 261/144
[58] Field of Search ............... 123/557, 556, 555, 552, 123/553; 261/144, 145

[56] References Cited

U.S. PATENT DOCUMENTS

| | | | |
|---|---|---|---|
| 1,318,068 | 10/1919 | Giesler | 123/557 |
| 3,986,486 | 10/1976 | Rabbiosi | 123/557 |
| 4,106,453 | 8/1978 | Burley | 123/557 |
| 4,146,002 | 3/1979 | Quinn | 123/557 |

*Primary Examiner*—Ronald H. Lazarus

*Attorney, Agent, or Firm*—Craig and Antonelli

[57] ABSTRACT

A water cooled internal combustion engine, especially for utility vehicles operated with a gas which is stored in a liquid condition in a fuel tank. The internal combustion engine includes a cooling water cycle containing a thermostat, a cooler and a water pump. A fuel vaporizer is heated by the cooling water cycle of the internal combustion engine with an air intake preheater likewise being heated by the cooling water cycle. A throttle valve is arranged between the air/gas mixer and working cylinders of the engine. An externally heated water cycle is additionally provided in such a way that the externally heated water cycle is connected functionally in parallel with the cooling water cycle. The water cycles are joined by a conduit with a thermostatic valve being arranged within the conduit so that the two cycles can be switched in such a manner than, in dependence upon the temperature, water from the externally heated water cycle and/or from the cooling water cycle is conducted through the fuel vaporizer and intake air preheater. The externally heated water cycle, when the internal combustion engine is not yet warmed up for operation, and the cooling water cycle, when the internal combustion engine is warmed up for operation, are switched on with respective priority.

21 Claims, 2 Drawing Figures

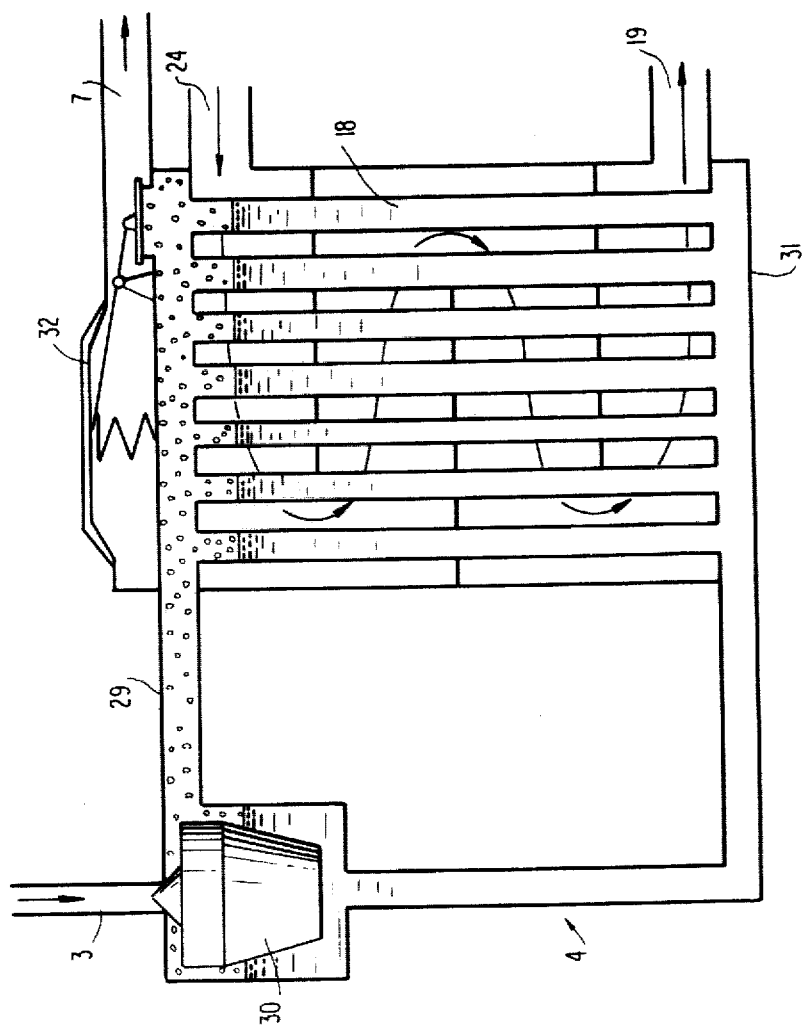

INTERNAL COMBUSTION ENGINE, ESPECIALLY FOR TRUCKS DRIVEN WITH GAS-STORED IN LIQUID CONDITION IN A FUEL TANK

The present invention relates to an internal combustion engine and, more particularly, to a gas operated internal combustion engine, especially for utility vehicles such as trucks driven with gas stored in a liquid condition in a fuel tank, which includes a cooling water cycle or circulation system containing a thermostat, a cooler, and a water pump, and with a fuel vaporizer heated by the cooling water circulation system of the internal combustion engine, in addition to an intake air preheater likewise heated by the cooling water circulation system of the internal combustion engine, an air/gas mixer, and a throttle valve arranged between the air/gas mixer and working cylinders of the engine.

The mixture treatment of high octane fuels which, under normal pressure and normal temperature, are in liquid form for gasoline engines usually takes place by way of a carburetor system or with the aid of a low pressure intake manifold injection installation.

Problems are encountered in attempting to transfer such systems which are used in passenger motor vehicles to large volume slow-running engines normally employed for utility vehicles such as trucks since, the trucks are subject to different requirements such as, for example, ruggedness, simple servicing, and special usage conditions. Additionally, it is frequently unnecessary to exploit the theoretical potential power of the internal combustion engine as utilized in a passenger motor vehicle.

The aim underlying the present invention essentially resides in providing an internal combustion engine by which it is possible to obtain a reliable vaporization of liquid fuel prior to entering gas control elements and to maintain a gaseous phase of the fuel up to the individual cylinder of the engine.

In accordance with advantageous features of the present invention, in addition to the cooling water circulation system for the internal combustion engine, an externally heated water circulation system with its own feed pump is additionally provided in such a way that the externally heated water cycle is connected functionally in parallel with the cooling water circulation system of the internal combustion engine. The two coolant circulation systems are joined by a conduit with a thermostatic valve being arranged within the conduit so that the two circulation systems can be switched in such a manner that, in dependence upon the temperature, coolants such as water from the externally heated circulation system and/or from the cooling water circulation system of the internal combustion engine is conducted through the fuel vaporizer and air intake preheater wherein the externally heated coolant water circulation system, when the engine is not yet warmed up for operation, and the cooling water circulation system of the engine, when the engine is warmed up for operation, are switched on with respective priority.

By virtue of the above-noted features of the present invention, it is possible to utilize the cooling water circulation system of the internal combustion engine for mixture preparation of the fuel for a normal operation, especially for fuels having a boiling point or boiling range which lies below the temperature of the cooling water of the internal combustion engine when the engine is at a normal operating temperature. In contrast to the normal operating temperature of the internal combustion engine, during the startup of a cold engine, the ignition is employed to turn on an external heater of the additional cooling water circulaton system. During this startup procedure, a blocking means preferably blocks the starter of the internal combustion engine until an appropriate vaporizing temperature for the fuel vaporizers has been attained and a thermostat releases a lock locking the starter. In this connection, it may be advantageous to effect several revolutions of the internal combustion engine for enabling a heating up of the air intake system without the addition of fuel. During a subsequent warm up operation of the engine, the external heater remains turned on. Additionally, the same untreated fuel may readily be utilized in the internal combustion engine of the present invention for starting and normal operation thereof.

Advantageously, in accordance with the present invention, the thermostatic valve arranged within the conduit joining the two cooling water circulation systems has a switching or operating point which is lower by 5° to 10° C. than a switching or operating point of the thermostat connecting or disconnecting the cooling unit, i.e. radiator, to or from the cooling water circulation system of the internal combustion engine whereby, the cooling water circulation system of the internal combustion engine, which is warmed up due to the operation of the engine, takes place with priority before the vehicle cooling unit is switched in to the cooling water circulatory system by the thermostat.

In addition with further advantageous features of the present invention, when a temperature threshold has been exceeded, it is possible to cut off the external heater and feed pump of the externally heated water circulatory system.

To enable the selective turning on of the externally heated water circulatory system and the cooling water circulatory system of the internal combustion engine or both in parallel, advantageously, the thermostatic valve is constructed as a three/two-way valve.

Moreover, in order to provide for a faster warm up of the cooling water circulatory system of the internal combustion engine, exhaust pipes from the engine may be included in the cooling water circulatory system and may, for example, be provided with a cooling water jacket or the like thereby enabling the cooling water circulatory system to be connected with relatively low exhaust gas temperatures.

Preferably, the fuel vaporizer of the present invention may be equipped with a level control means or float for a liquid-fuel feed and with a pressure controller for a delivery of the gaseous fuel.

By virtue of the provision of the level control feature, a choking of the internal combustion engine due to a deficient vaporization is reliably avoided and the vaporizing rate is automatically regulated through the vapor pressure. With the temperature of the cooling water being the same and low vapor consumption, i.e., when the engine is operated in a partial load range, the vapor pressure will rise until an equilibrium is attained or, in other words, the vaporization of the fuel becomes correspondingly less.

Special insulating measures for maintaining the gaseous phase up to the point of the cylinders are unnecessary if a suitable arrangement of the components and a careful warm up of the intake air and fuel are ensured. The vacuum ambient in the system and the concomitant drop in a boiling point constitute additional precautionary factors against the condensation of the fuel.

Moreover, the liquid fuel can be fed to the fuel vaporizer by means of a feed pump, and an overflow valve may be arranged between the pump and fuel vaporizer.

Additionally, as a safety feature, an appropriate safety valve may be provided at the fuel vaporizer.

Due to the bypass control of the heated cooling water, in accordance with the present invention, the air preheating unit is constructed in such a manner that during a full load there is almost no heating up of the intake air, while the heating effect rises with increasing partial load operation of the engine.

Accordingly, it is an object of the present invention to provide an internal combustion engine, especially for trucks driven with gas stored in a liquid condition in a fuel tank, which avoids by simple means, shortcomings and disadvantages encountered in the prior art.

Another object of the present invention resides in providing an internal combustion engine, especially for utility vehicles, which ensures a reliable vaporization of liquid fuel and the maintenance of the gaseous phase up to the individual cylinders of the engine.

Another object of the present invention resides in providing an internal combustion engine which ensures a faster warm up of the coolant system of the engine as well as a faster lowering of the high exhaust gas temperatures.

A further object of the present invention resides in providing an internal combustion engine which enables the use of the same untreated fuel for both starting and operation of the engine.

A still further object of the present invention resides in providing an internal combustion engine which utilizes the coolant water circulatory system of the engine for a fuel mixture preparation for normal operation of the engine.

A still further object of the present invention resides in providing an internal combustion engine, especially for utility vehicles driven by a gas stored in a liquid condition in a fuel tank, which function reliably under all operating conditions.

These and other objects, features, and advantages of the present invention will become more apparent from the following description when taken in connection with the accompanying drawings which show, for the purposes of illustration only, one embodiment in accordance with the present invention, and wherein:

FIG. 1 is a schematic switching diagram for an internal combustion engine operated on methanol in accordance with the present invention; and FIG. 2 is a schematic view of a fuel vaporizer means for a methanol gas engine of FIG. 1.

Referring now to the drawings wherein like reference numerals are used and both used to designate like parts and, more particularly, to FIG. 1, according to this figure, a fuel tank 1 accommodates a supply of liquid fuel, with the fuel being conveyed by means of a fuel pump 2 through a fuel line 3 to a fuel vaporizer generally designated by the reference numeral 4. An overflow valve 5, formed as a check valve, is arranged between the fuel pump 2 and the fuel vaporizer 4 so that excessively fed fuel may return to the fuel tank 1 through a conduit or return line 6.

Vaporized fuel, that is, fuel in a gaseous phase, passes from the fuel vaporizer 4 through a pipe system 7 to an air/gas mixer 8 and through an intake connecting pipe 9, provided with a throttle valve 10, to cylinders (not shown) of an internal combustion engine 11.

The internal combustion engine 11 is provided with a cooling water circulatory system 12 which includes a water pump 13. A conventional thermostat 14 is provided and is adapted to switch in a vehicle cooling unit such as a radiator 15 into the cooling water circulatory system 12 upon the temperature of the cooling water reaching a predetermined level.

In addition to the cooling water circulatory system 12, an externally heated water circulatory system 24 is provided, with the two water circulatory systems 12, 24 being connected by a pipe or conduit 17. A thermostatic valve 16 is disposed in the conduit 17, with the valve 16 being constructed as a three/two-way valve and being capable of expanding and/or switching over the cooling water circulatory system 12 in such a manner that the cooling water of the system 12 is passed through the pipeline 17 to heat exchanger 18 arranged at the fuel vaporizer 4, through a further conduit 19 to an intake air preheater 20, through a conduit 21 to an exhaust gas heat exchanger 22, and through a conduit section 23 back to the water pump 13.

A feed pump 25 is provided for circulating water in the water circulatory system 24 and the water in the system 24 being heated by means of an external heating unit 26. Preferably, the fuel for the heating unit 26 is the same fuel as contained in the fuel tank 1. The water from the circulatory system 24 is conducted through the heat exchanger 18 through the conduit 19 to the intake air preheater 20, through a branch conduit 27 and through a return conduit 28 back to the feed pump 25.

The switching or operating point of the thermostatic valve 16 is lower than the switching or operating point of the thermostat 14 by about 5° to 10° C. Depending on a position of the thermostatic valve 16, the water circulatory system 24 and/or the cooling water circulatory system 12 may pass through the heat exchanger 18 of the fuel vaporizer 4 and consequently also heat up the intake air preheater 20. When the operating temperature of the internal combustion engine 11 has been reached, the external heating unit 26 is turned off in a conventional manner by a thermostat (not shown).

As shown in FIG. 2, the fuel vaporizer 4 includes a housing 29 with a fuel line 3 for supplying liquid fuel from the fuel tank 1 to the vaporizer 4. The fuel line 3 is adapted to be sealed off by level control means or float 30. Advantageously, the fuel is introduced at the bottom 31 of the housing 29; whereas the heated water of the circulatory systems 12, 24 enters the heat exchanger 18 from above and heats up the fuel by the countercurrent principle, that is, the hottest zone of the heat exchanger always lies in the region of the fuel vaporization zone. To feed vaporized fuel to the air/gas mixer 8, a diaphragm-operated pressure control valve 32 is arranged at an inlet orifice of the pipe system 7. Additionally, a safety valve (FIG. 1) is provided for the fuel vaporizer 4 and is connected to the fuel tank 1 through a conduit 34.

By virtue of the provision of the level control unit 30, a choking of the internal combustion engine 11 due to a deficient vaporization is reliably prevented. Additionally, in the illustrated arrangement, the vaporization rate is automatically regulated by way of the vapor pressure, that is, with the cooling water temperature remaining the same and low vapor consumption, i.e., the engine operating in a partial load range, the vapor pressure will rise until an equilibrium is re-attained and only such quantity of fuel can vaporize as is being consumed.

The internal combustion engine illustrated in FIGS. 1 and 2 operates in the following manner:

With an activation of the ignition system of the internal combustion engine 11, the external heater 26 and the feed pump 25 are likewise turned on while the starter unit of the internal combustion engine 11 is blocked, in a conventional manner, by a temperature or pressure-dependent member (not shown) until the predetermined operating temperature has been reached in the fuel vaporizer 4 and in the intake air preheater 20 through the water circulatory system 24. During this procedure, the thermostatic valve 16 prevents the flow of cooling water through the pipe system 17. After the vaporizer 4 and intake air preheater 20 have reached a predetermined temperature, an appropriate signal such as, for example, a light or visual signal can be provided in a conventional manner which signals that the starter unit of the engine has been released and the engine 11 can then be started up.

During a warm up of the internal combustion engine 11, the external heater 26 remains in operation. Once a temperature threshold has been reached for the cooling water in the circulatory system 12, the thermostatic valve 16 opens up the flow through the pipe system 17 and only in a last phase of the warm up process will the external heating unit 26 be turned off and, optionally, by means of the thermostat 14, will the cooling water of the circulatory system 12 be permitted to flow through the vehicle cooling unit or radiator 15.

Since the fuel vaporizer 4 and the intake air preheater 20 absorb approximately one-third of the temperature of the cooling water of the circulatory system 12, less fan power is required. Additionally, by means of the exhaust gas heat exchanger 22 which, on the one hand, serves for a faster warm up of the cooling water of the circulatory system 12, a faster lowering of the high exhaust gas temperatures is attained so that a roof exhaust on the utility vehicle or truck may be omitted.

While we have shown and described only one embodiment in accordance with the present invention, it understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A water-cooled internal combustion engine adapted to be operated on a gaseous fuel stored as a liquid fuel in a fuel tank, the internal combustion engine includes a cooling water circulatory means, a fuel vaporizer means adapted to be heated at least by the cooling water circulatory means, an intake air preheater means adapted to be heated at least by the cooling water circulatory means, an intake air/gas mixer means, and a throttle valve means arranged between the air/gas mixer means and working cylinders of the internal combustion engine, characterized in that an externally heated water circulatory means is provided, conduit means are provided for communicating the circulatory means with each other, and the thermostatic control valve means are arranged in the conduit means for selectively controlling the communication between the two circulatory means in dependence upon a temperature such that water from at least one of the cooling water circulatory means and the externally heated water circulatory means are conducted through the fuel vaporizer means and the intake air preheater means whereby the externally heated water circulatory means, when the internal combustion engine has not reached a predetermined operating temperature, and the cooling water circulatory means, when the internal combustion engine has reached a predetermined operating temperature, are switched on with respective priority.

2. An internal combustion engine according to claim 1, characterized in that the cooling water circulatory means includes a cooler means, a thermostat means for controlling a flow of cooling water through the cooler means, and a cooling water pump means.

3. An internal combustion engine according to claim 2, characterized in that the externally heated water circulatory means includes an external heating unit and a feed pump means, and in that the externally heated water circulatory means is functionally connected in parallel with the cooling water circulatory means.

4. An internal combustion engine according to claim 3, characterized in that the internal combustion engine is installed in a truck.

5. An internal combustion engine according to claim 3, characterized in that the thermostatic control valve means is constructed so as to have an operating point which is about 5° to 10° C. lower than an operating point of the thermostat means for controlling a flow of the cooling water through the cooler means.

6. An internal combustion engine according to claim 5, characterized in that an additional thermostat means is operatively connected to the externally heated water circulatory means for shutting off the external heating unit and the feed pump means of the externally heated water circulatory means.

7. An internal combustion engine according to claim 6, characterized in that the thermostatic control valve means is constructed as a three/two-way valve.

8. An internal combustion engine according to claim 7, characterized in that the internal combustion engine includes exhaust pipe means, and in that the cooling water circulatory means includes means for incorporating the exhaust pipe means in the cooling water circulatory means.

9. An internal combustion engine according to claim 8, characterized in that said incorporating means includes cooling water jackets surrounding at least a portion of the exhaust pipe means.

10. An internal combustion engine according to claim 8, characterized in that the fuel vaporizer means includes a fuel level control means for controlling a feed of the liquid fuel, and a pressure regulating means for controlling a delivery of gaseous fuel from the vaporizer means.

11. An internal combustion engine according to claim 10, characterized in that the fuel level control means includes a float means arranged in the vaporizer means.

12. An internal combustion engine according to claim 11, characterized in that a feed pump means is provided for feeding liquid fuel to the fuel vaporizer means, and in that an overflow valve means is arranged between the liquid fuel feed pump means and the fuel vaporizer means.

13. An internal combustion engine according to claim 12, characterized in that a safety valve means is provided at the fuel vaporizer means.

14. An internal combustion engine according to claim 2, characterized in that the thermostatic control valve means is constructed so as to have an operating point which is above 5° to 10° C. lower than an operating point of the thermostatic means for controlling a flow of the cooling water through the cooler means.

15. An internal combustion engine according to claim 3, characterized in that an additional thermostat means is operatively connected to the externally heated water circulating means for shutting off the external heating unit and the feed pump means of the externally heated water circulating means.

16. An internal combustion engine according to one of claims 1, 2, 3, or 5, characterized in that the thermostatic control valve means is constructed as a three/two-way valve.

17. An internal combustion engine according to one of claims 1, 2, or 3, characterized in that the internal combustion engine includes exhaust pipe means, and in that the cooling water circulatory means includes means for incorporating the exhaust pipe means in the cooling water circulatory means.

18. An internal combustion engine according to one of claims 1, 2, or 3, characterized in that the fuel vaporizer means includes a fuel level control means for controlling a feed of the liquid fuel, and a pressure regulating means for controlling a delivery of gaseous fuel from the vaporizer means.

19. An internal combustion engine according to claim 18, characterized in that the fuel level control means includes a float means arranged in the vaporizer means.

20. An internal combustion engine according to one of claims 1, 2, or 3, characterized in that a feed pump means is provided for feeding liquid fuel to the fuel vaporizer means, and in that an overflow valve means is arranged between the liquid fuel feed pump means and the fuel vaporizer means.

21. An internal combustion engine according to claim 20, characterized in that a safety valve means is provided at the fuel vaporizer means.

* * * * *